United States Patent [19]

Sakai et al.

[11] 4,411,505
[45] Oct. 25, 1983

[54] CAMERA

[75] Inventors: Shinji Sakai; Nobuhiko Shinoda, both of Tokyo; Kazuya Hosoe, Kunitachi; Takao Kinoshita, Tokyo, all of Japan

[73] Assignee: Canon Kabushiki Kaisha, Tokyo, Japan

[21] Appl. No.: 358,537

[22] Filed: Mar. 16, 1982

[30] Foreign Application Priority Data

Mar. 31, 1981 [JP] Japan .................................. 56-47613

[51] Int. Cl.³ ............................................. G03B 3/10
[52] U.S. Cl. ..................................................... 354/25
[58] Field of Search ......................................... 354/25

[56] References Cited

U.S. PATENT DOCUMENTS 4,341,953 7/1982 Sakai et al. ...................... 354/25 X Primary Examiner—Michael L. Gellner
Attorney, Agent, or Firm—Fitzpatrick, Cella, Harper & Scinto

[57] ABSTRACT

The invention provides a camera which uses a signal integrating and accumulating type image sensor for receiving light from a photographing optical system prior to the photographing operation and for producing an output which can be utilized for a predetermined purpose, with the integrating time of the image sensor being controlled in accordance with the output from the image sensor. According to the improvements of the present invention, the signal integrating time of the image sensor is fixed, in association with the photographing operation, at the value of that of the integrating operation just before the photographing operation.

26 Claims, 21 Drawing Figures

CAMERA

BACKGROUND OF THE INVENTION

1. Field of the Invention

The present invention relates to a camera and, more particularly, to a camera which uses, as a light receiving means, a signal integrating and accumulating type image sensor for receiving light from a photographing optical system prior to the photographing operation and for producing an output which may be utilized for a predetermined purpose. The integrating time of the image sensor is controlled on the basis of the output thereof.

2. Description of the Prior Art

Various focus detecting systems for cameras has been proposed and many of them are already available on the market.

Although various types are known for these focus detecting systems, the focus detecting systems of so-called TTL (Through The Lens) type are particularly suitable for single reflux cameras. In the TTL type the light from a photographing lens is received by a light-receiving element and the focusing state of the photographing lens is detected on the basis of an output signal from the light-receiving element.

The same assignee of the present invention has already proposed several focus detecting systems of the TTL type wherein a signal integrating and accumulating type image sensor such as a photodiode array, a CCD (Charge Coupled Device) or a BBD (Bucket Brigade Device) is used as the light-receiving means. The image formed by the imaging optical system is scanned by the image sensor, and sharpness of the image formed on a predetermined imaging plane is detected on the basis of the scanning signals obtained by the scanning operation to thereby detect the focusing state of the imaging optical system.

When the signal integrating and accumulating type image sensor is used as the light-receiving means in place of the conventional photoelectric transducer elements, the incident optical energy is converted into electric signals (e.g., charge) which are then integrated and accumulated for a desired period of time and are thereafter output as time-serial signals. Therefore, the sensor elements can be made extremely small, so that signals of high precision may be obtained as the scanning signals. Furthermore, the signals may be easily optimized by controlling the signal integrating time, without a mechanical means for controlling the amount of incident light such as a diaphragm. Because of such advantages, the system ensures high performance in focus detection.

The signal integrating time may be controlled in various manners, such as, e.g., by an output from a separate photometer. In the proposals described above, which are made by the same assignee of the subject application, a more efficient method is adopted according to which the luminance information of an object to be photographed is obtained from the output of the image sensor, and the signal integrating time in the next signal integrating operation is controlled on the basis of this luminance information.

When a focus detecting system of this type is incorporated into a single reflux camera, the problems described below occur. In general, so light is incident on the image sensor during photographing (film exposure). Therefore, if the signal integrating time is being controlled during this time, the signal integrating time of the image sensor is set at the maximum extent of the adjustable period of time. Then, it takes a certain amount of time before the signal integrating time is restored to the optimum value for the next photographing operation. This results in a low response of the system or unstable operation. In particular, when continuous photography is to be performed, the shutter chances may be missed.

SUMMARY OF THE INVENTION

In view of the above, it is an object of the present invention to provide improvements on a camera which uses a signal integrating and accumulating type image sensor for receiving light from a photographing optical system prior to the photographing operation and for producing an output which may be utilized for a predetermined purpose. The integrating time of the image sensor is controlled on the basis of the output thereof, to eliminate the disadvantages of the prior art, as described above, which are encountered in controlling the signal integrating time during the photographing operation, to enhance the responsible of the system in the continuous photography mode, and, furthermore, to stabilize the photographing operation.

In order to achieve this object, the camera of the present invention is provided with means for fixing the signal integrating time of the image sensor at the value of that of the signal integrating operation just before the photographing operation.

Although the present invention will be described with reference to a focus detecting system for a camera, the basic concept of the present invention, i.e., fixing of the signal integrating time of the image sensor in association with the photographing operation of the camera, need not be limited to the focus detecting systems for cameras but may be applied to cameras wherein the signal integrating time of CCDs, BBDs or photodiode arrays (MOS image sensors) must be controlled. Therefore, it is to be understood that the present invention is not limited to the embodiments to be described hereinafter but various changes and modifications may be made within the spirit and scope of the present invention.

According to one embodiment of the present invention to be described herein, there is provided a focus detecting system for a camera which uses a signal integrating and accumulating type image sensor for receiving light from a photographic optical system prior to the photographing operation (film exposure) and for producing an output which may be utilized for a predetermined purpose. The integrating time of the image sensor is controlled on the basis of the output from the image sensor, wherein means is provided for fixing, in association with the photographing operation (film exposure), the signal integrating time of the image sensor at the value of that of the integrating operation just before the photographing (film exposure) operation.

The above and other objects and features of the present invention will become apparent from the following description taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are schematic views for explaining the principle of a focus detection operation of an example of a focus detecting system to which the improvements according to the present invention may be applied, wherein FIG. 1A shows the optical arrangement of the focus detecting system, FIG. 1B shows the configuration of light-receiving sections of a photoelectric transducer element shown in FIG. 1A, and FIG. 1C shows changes in sharpness of the image at three points in FIG. 1A.

DESCRIPTION OF THE PREFERRED EMBODIMENTS

Figure 1A:
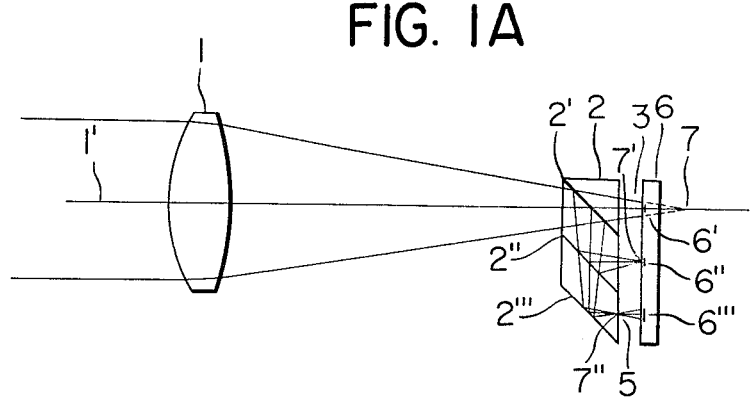

Referring to FIG. 1A, an imaging lens 1 has an optical axis 1'. A beam splitter 2 is arranged in the optical path of the imaging lens 1 and has semi-transmittal sections 2' and 2" and a total reflection section 2'''. Light emerging from the imaging lens 1 becomes incident on the semi-transmittal section 2', and is then divided by the semi-transmittal section 2" and the total reflection section 2''' into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy for the three divided light rays 3, 4 and 5 becomes substantially the same. A photoelectric transducer 6 has three light-receiving sections 6', 6" and 6'''.

If the convergent point of the light ray 3 is at point 7, it is easily seen that the convergent points of the divided light rays 4 and 5 are at points 7' and 7", respectively. If the convergent point of the light ray 4 which is reflected and divided by the semi-transmittal section 2" coincides with the light-receiving section 6", the convergent point 7 of the light ray 3 incident on the light-receiving section 6' is located behind the light-receiving section 6', and the convergent point 7" of the light ray 5 incident on the light-receiving section 6''' is located in front of the light-receiving section 6'''. The deviations of these converging points from the light-receiving sections become the same if the distances between the semi-transmittal sections 2' and 2" and between 2" and the total reflection section 2''' are equal to each other. As a result, the sharpness of the image on the light-receiving section 6" becomes maximum, and the sharpnesses of the images on the light-receiving sections 6' and 6''' become low but are similar to each other.

Figure 1B:
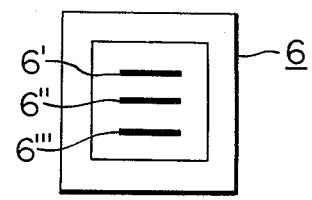
Figure 1C:
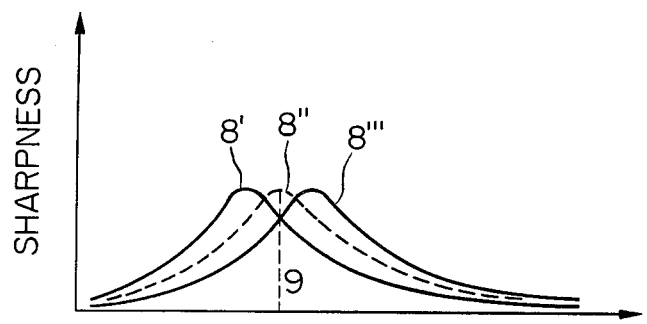

If the imaging lens 1 is displaced along the optical axis 1', the sharpnesses of the images on the light-receiving sections 6', 6" and 6''' change as shown in FIG. 1C. Curves 8', 8" and 8''' representing changes in the sharpnesses of the images on the light-receiving sections 6', 6" and 6''' form peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to coinside substantially with the predetermined focal plane (the film surface in the case of a camera) of the imaging lens 1, it is detected that the imaging lens 1 is in the in-focus state under the condition shown in FIG. 1A, that is, the relationships between the sharpnesses of the images on the respective light-receiving sections 6', 6" and 6''' are represented by the point 9 in FIG. 1C. Then, it is apparent from FIG. 1C that the relationships between the sharpnesses 8' and 8''' are inverted according to whether the imaging plane surface of the lens 1 is in front of or behind the light-receiving section 6". In this manner, the near-focus state and the far-focus state can be detected.

FIG. 1B is a front view of the photoelectric transducer 6 wherein the respective light-receiving sections 6', 6" and 6''' comprise, for example, belt-shaped linear CCDs. However, the shape of the light-receiving sections is not necessarily limited to this shape.

A focus detecting system is thus obtained which has the beam splitter 2 and the photoelectric transducer 6 with the three light-receiving sections 6', 6" and 6'''.

Figure 2:
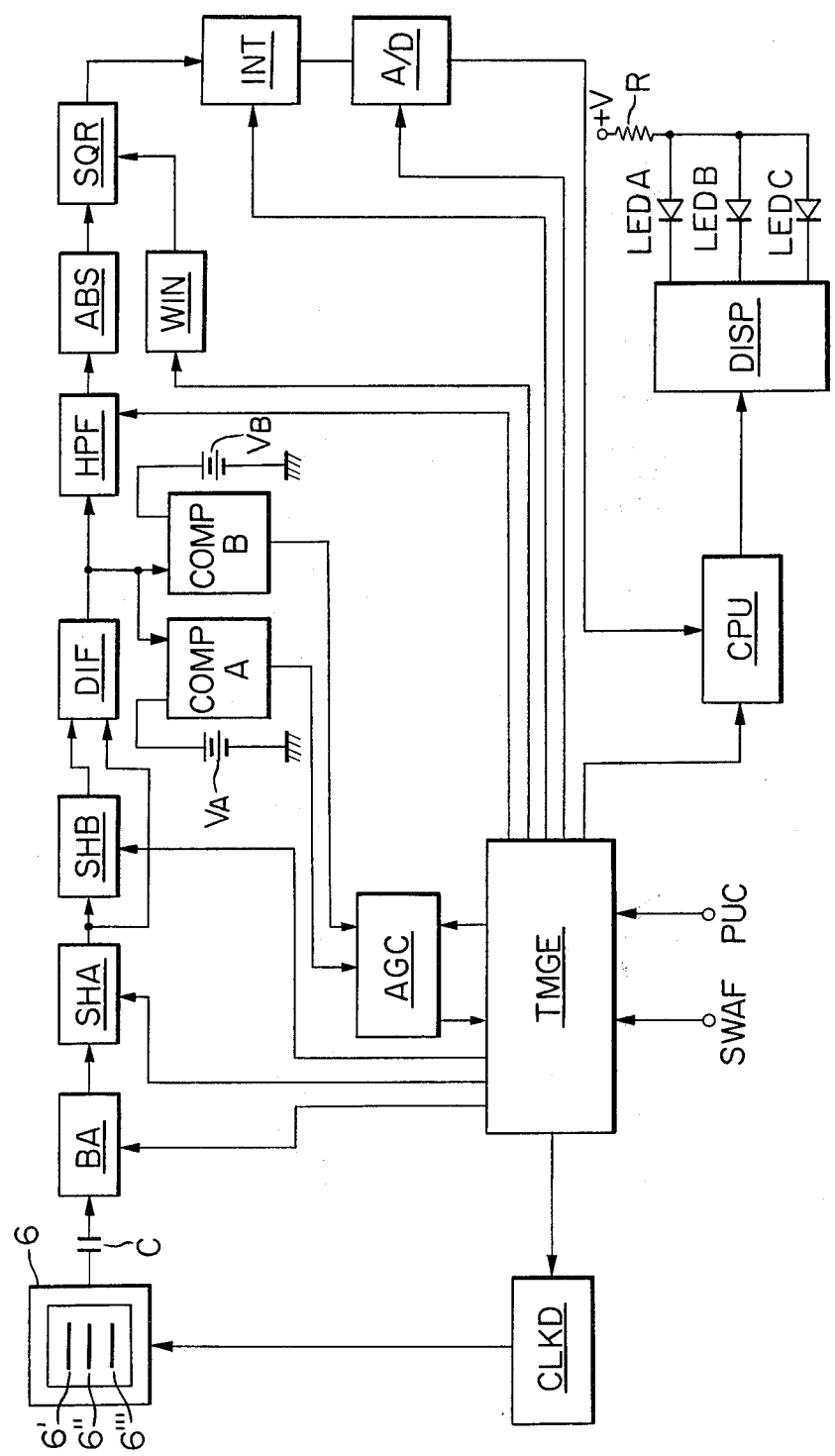
FIG. 2 is a block diagram showing the configuration of electric circuitry of an example of the focus detecting systems according to the principle shown in FIGS. 1A to 1C.

FIG. 2 shows a block diagram of an electric circuit which reads image signals from the light-receiving sections 6', 6" and 6''', extracts sharpness signals, and discriminates the magnitudes of sharpness of the image at three points. Many of the blocks shown in FIG. 2 are of known configuration and details of them are shown in a series of applications as in U.S. patent application Ser. No. 59,635, "Focus Detecting System", Kinoshita et al, filed on July 23, 1979 (corresponding German DOLS No. 29 30 636), U.S. patent application Ser. No. 151,703, "Image Sharpness Detecting System", Kawabata et al, filed on May 20, 1980 (corresponding German patent application Ser. No. P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6" and 6'''. A series of clock signals for operating the CCD 6 are supplied from a clock driver CLKD. These clock signals are supplied to initiate a series of operations of the CCD 6 such as integration, transfer, resetting and so on in a predetermined order. The charge accumulated for a predetermined period of time in the CCD 6 is chargevoltage converted at the output of the CCD 6 and is thereafter input, as an image signal, to a balance adjusting circuit BA through a capacitor C for suppressing noise. These image signals corresponding to the three light-receiving sections 6', 6" and 6''' of the CCD 6 are time-serially read out in an order which is determined by the configuration of the CCD 6.

Figure 3:
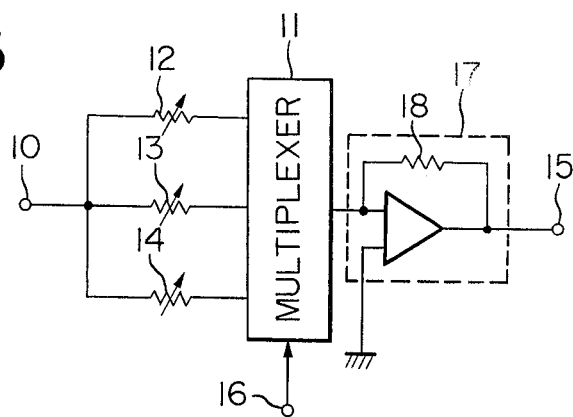
FIG. 3 is a partial circuit diagram showing an example of a balance adjusting circuit shown in the circuitry of FIG. 2.

The balance adjusting circuit BA, as shown in FIG. 3, has a multiplexer 11 of known configuration and three variable resistors 12, 13 and 14. Referring to FIG. 3, the image signal as described above is supplied to the multiplexer 11 through the variable resistors 12, 13 and 14. In response to a synchronizing signal received from a terminal 16, the multiplexer 11 receives the image signals corresponding to the respective light-receiving sections 6', 6" and 6''' through the variable resistors 12, 13 and 14, respectively, and outputs them to an amplifier 17. The variable resistors 12, 13 and 14 control the balance of the image signals from the light-receiving sections 6', 6" and 6'''. The outputs from the resistors 12, 13 and 14 are input through the multiplexer 11 to the amplifier 17 where the gains of the respective images are controlled according to their ratios by a feeding resistor 18 and then are input to the next electric circuit. Balance adjustment of the image signals is useful when there is an imbalance in the three light rays 3, 4 and 5 divided by the beam splitter 2. The synchronizing signal is supplied at the terminal 16 from a timing generator TMGE. Although three variable resistors are used in this embodiment, two variable resistors may be used to balance two image signals in relation to the remaining image signal.

Signal processing in this circuitry must be performed according to a series of synchronizing signals which are supplied from the timing generator TMGE. In response to an operation command signal SWAF of the circuitry (a signal generated in synchronism with the depression of a shutter release button to the first position in the case of a camera) and a power clear signal PUC, the timing generator TMGE generates the various synchronizing signals to the respective blocks in the circuitry in a predetermined order. The timing generator TMGE may be of a known configuration and need only generate the group of synchronizing signals suitable for the operation of the circuitry of this embodiment. The clock driver CLKD also operates in response to the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD 6 are influenced by the dark current since the actual CCD comprises a semiconductor. Therefore, the actual image signal includes the dark current level superposed on the signal corresponding to the actual amount of incident light. Thus, the image signal as it is contains a noise component. Part of the light-receiving section of the CCD is masked with an aluminum mask or the like, and a signal output from this part is considered to be the dark current level. Then, the difference is obtained between the output from the unmasked light-receiving section and the output of the masked part (to be referred to as a dark current bit hereinafter), that is, the dark current level, to remove the influence of the dark current. The dark current bit (not shown) is included at the end of each of the light-receiving sections 6', 6" and 6''' of the CCD 6, so that this bit is output first. A second sampling and holding circuit SHB samples and holds the output level of these dark current bits. The second sampling and holding circuit SHB receives commands from the timing generator TMGE for holding the output level. A differential amplifier DIF receives the output signal from the sampling and holding circuit SHA and the output signal from the sampling and holding circuit SHB and takes the difference between these two inputs. The image signals obtained as the output of the differential amplifier DIF are signals whose dark current level is cancelled and which correctly correspond to the amount of incident light.

The output of the differential amplifier DIF is input to a high-pass filter HPF and to two comparators COMPA and COMPB. A reference voltage VA is supplied to the comparator COMPA and a reference voltage VB is supplied to the comparator COMPB. These comparators COMPA and COMPB constitute a window comparator.

Figure 4A:
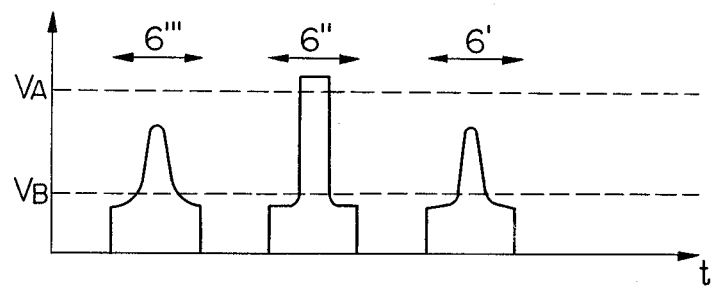
FIGS. 4A to 4C show signal waveforms for explaining the function of a window comparator shown in FIG. 2, which discriminates whether the signal integrating time (accumulating time) is appropriate.
Figure 4B:
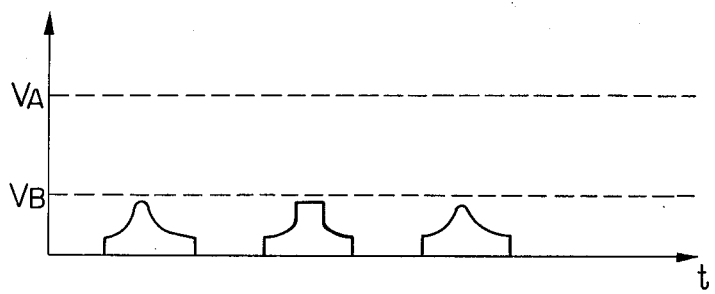
Figure 4C:
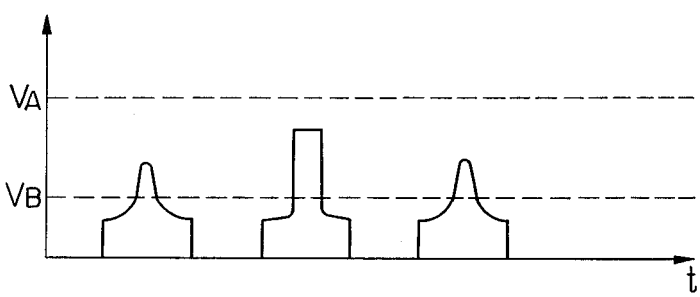

The mode of operation of the window comparator will now be described with reference to FIGS. 4A–4C. FIGS. 4A, 4B and 4C show the relationship between the peak value of the image signal compensated for the dark current level (to be referred to as the dark current-compensated image signal hereinafter) and the reference voltages VA and VB, the time being plotted as the abscissa and the voltage being plotted as the ordinate. The ranges in FIG. 4A indicated by arrows at 6''', 6" and 6' represent the timings with which the image signals are output from the light-receiving sections 6''', 6" and 6', respectively. In FIG. 4A, part of the dark current-compensated signal (part of 6") exceeds the reference voltages VA and VB, and the signal level is too high. In this case, the outputs of both the comparators COMPA and COMPB are at high level. In FIG. 4B, the dark current-compensated signal is lower than the reference voltage VB and the signal level is too low. In this case, the outputs of both the comparators COMPA and COMPB are at low level. In FIG. 4C, the peak value of the dark current-compensated signal is between the reference voltages VA and VB and is at a suitable level. In this case, only the output of the comparator COMPB is at high level, and the output of the comparator COMPA is at low level. If the reference voltages VA and VB are so selected to set the suitable level of the dark current-compensated signal, the combination of the high or low level of the outputs of the comparators COMPA and COMPB indicates the appropriateness of the dark current-compensated signal level. If VA>VB in this embodiment, when the outputs of both the comparators COMPA and COMPB are at high level, it indicates that the dark current-compensated signal is at too high a level including saturation level. When the outputs of both the comparators COMPA and COMPB are at low level, it indicates that the dark current-compensated signal level is too low. Only when the output of the comparator COMPA is at low level and the output of the comparator COMPB is at high level, it indicates that the dark current-compensated signal is at a suitable level.

The outputs of the comparators COMPA and COMPB are supplied to an accumulating time control circuit AGC for maintaining the appropriate dark current-compensated signal level by shortening the accumulating time of the CCD 6 when it is too high and by prolonging the accumulating time when it is too low. In response to a synchronizing signal from the timing generator TMGE, the accumulating time control circuit AGC operates so that it may be able to discriminate the state of the outputs of the comparators COMPA and COMPB at the timing at which the dark current-compensated signals are output from the light-receiving sections 6', 6" and 6'". Based on the output stage of the comparators COMPA and COMPB, the accumulating time control circuit AGC outputs a command signal to shorten or prolong the accumulating time to the timing generator TMGE. In response to the command signal, the timing generator TMGE so operates the clock driver CLKD that the accumulating time of the CCD 6 may be shortened or prolonged at the next output from the CCD 6.

The high-pass filter HPF evaluates the degree of change in the image. The high-pass filter extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6" and 6'" of the CCD 6 are input. This is to prevent the generation of an output from the light-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (dark to bright and bright to dark), if the output of the high-pass filter HPF was directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may utilize, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is high. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters inside the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6', 6" and 6'" of the CCD 6, the window function generating circuit WIN controls the gain of the squaring circuit according to the relationship determined in accordance with the location (location in the field of view).

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6', 6" and 6'". In this manner, the output of the integrating circuit INT corresponds to the electric output such as the sharpness of the respective images corresponding to the order of output from the light-receiving sections 6', 6" and 6'" of the CCD 6.

The analog output of the integrating circuit INT is input to an A-D converting circuit A/D for conversion into a digital value so that the signal processing may be facilitated for discrimination at a central processing unit CPU of an in-focus state, a near-focus state, and a far-focus state of the imaging lens 1.

FIGS. 5A–5F show the output waveforms of the respective blocks of the circuitry in order to clarify the analog processing of the series of signals representing the sharpness of the image, starting from the read-out of the image signals from the light-receiving sections 6', 6" and 6'" of the CCD 6 (the field of view for the three images) until the integration at the integrating circuit INT. In FIGS. 5A–5F, time is plotted as the abscissa and the voltage or current output is plotted as the ordinate in arbitrary units. The ranges indicated at arrows 6', 6" and 6'" in FIG. 5 represent the timings with which the signals corresponding to the light-receiving sections 6', 6" and 6'" of the CCD 6 are output and processed. The state of the respective images corresponds to the in-focus state of the imaging lens 1 in which the sharpness of the image of the light-receiving section 6" is highest, that is, the sharpness as shown at 9 in FIG. 1C is highest. FIG. 5 shows the state of the signal output from the CCD 6 only once, but these signals are repeatedly output in practice.

Figure 5A:
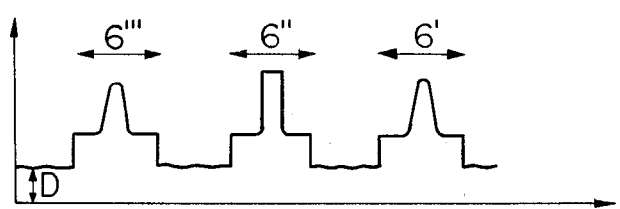
FIGS. 5A to 5F show output waveforms of the outputs of the main blocks of the circuitry shown in FIG. 2.
Figure 5B:
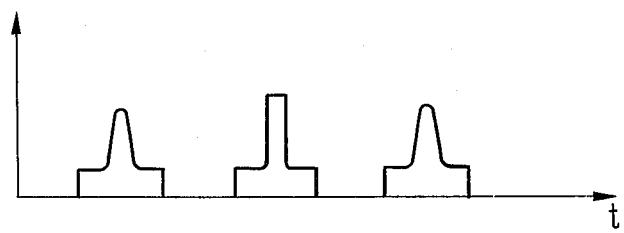
Figure 5C:
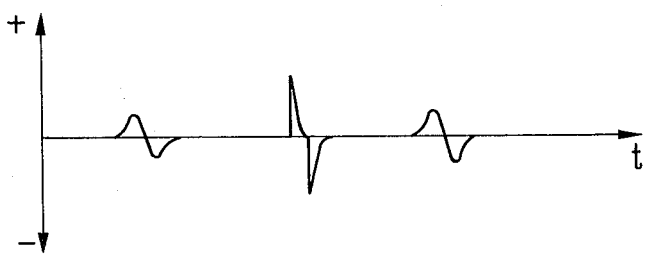
Figure 5D:
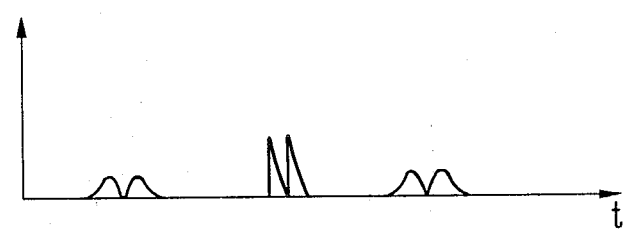
Figure 5E:
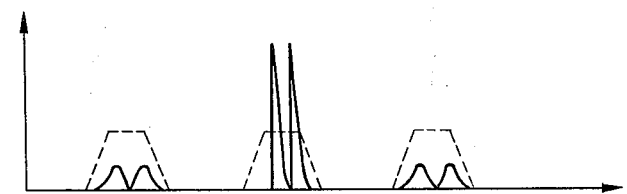
Figure 5F:
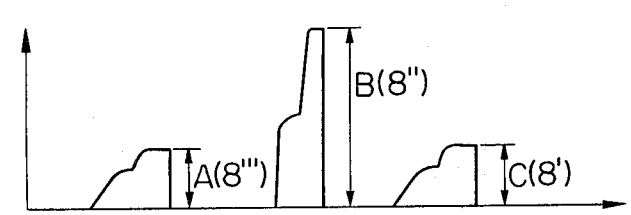

FIG. 5A shows the image signal which is output from the CCD 6 and has passed through the sampling and holding circuit SHA. The order for output of the images from the light-receiving sections is 6'", 6" and 6'. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by the broken lines show the manner in which the gain of the squaring circuit SQR changes within the field of view according to the shape of the window generated by the window function generating circuit WIN described above. FIG. 5F shows the output of the integrating circuit INT wherein levels A(8'"), B(8") and C(8') correspond to the sharpnesses of the images on the light-receiving sections 6'", 6" and 6', respectively. Specifically, A, B and C in FIG. 5F correspond to the levels of the curves 8''', 8'' and 8' of FIG. 1C at the point 9.

The levels A, B and C are converted into digital data by the A-D converting circuit A/D described above and are input to the central processing circuit CPU. The CPU computes the relationships among the levels A, B and C according to the pre-set conditions of the in-focus state, the near-focus state, the far-focus state, and the interruption of the discrimination. Basically, in the in-focus state, conditions B>A, B>C and A=C are satisfied. In the near-focus state, condition C>A is satisfied, and in the far-focus state, condition A>C is satisfied. The CPU discrminates which set of conditions is satisfied and outputs a signal corresponding to one of these three states. As the algorithm for the discrimination at the CPU, one may be adopted that is disclosed in U.S. patent application Ser. No. 151,533, "Focus Detecting System", Sakai et al, filed on May 19, 1980 (corresponding German Patent Application No. P 30 19 901.0) of the same assignee or in U.S. patent application Ser. No. 310,373, "Focusing State Discriminating System", Sakai et al, filed on Oct. 9, 1981.

The output of the central processing circuit CPU is input to the display circuit DISP. The display circuit DISP basically comprises a logic circuit and a drive circuit for driving indicators such as LEDs. In accordance with the commands from the central processing circuit CPU, in this embodiment, the display circuit DISP lights up the light-emitting diode LEDB in the case of in-focus state, and lights up the light-emitting diodes LEDC and LEDA, respectively, in the cases of near-focus and far-focus states to indicate that the imaging lens 1 is in the in-focus, near-focus or far-focus state. A protective resistor R is incorporated to protect the LEDA to LEDC when a voltage V is supplied to them. Although LEDs are used in this embodiment, liquid crystal display devices, electrochromies or the like may be used.

Figure 8:
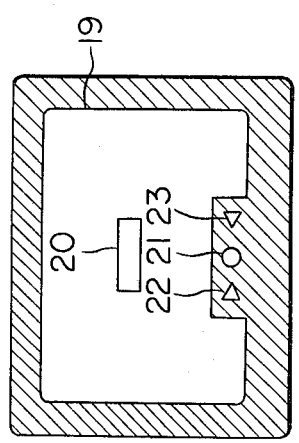
FIG. 8 is a schematic view showing an example wherein the focus detecting system as shown in FIG. 1 is applied to a camera.

FIG. 8 shows a focus detection display suitable for focusing of the photographic lens of a camera, which involves a range finder field frame 19 of the camera, a field mark 20 representing the location of the field of view, and a mark 21 representing the in-focus state of the photographic lens. The light-emitting diode LEDB shown in FIG. 2 is arranged immediately behind the mark 21. Arrow marks 22 and 23 (arrows represent the direction of rotation of a distance dial of the photographic lens for relocating it from the out-of-focus position to the in-focus position) representing the near-focus state and the far-focus state, respectively. The light-emitting diodes LEDC and LEDA shown in FIG. 2 are arranged immediately behind the arrow marks 22 and 23, respectively. In this manner, the operator is capable of confirming the focusing state of the photographic lens simply by observing which one of these marks is lit. If the mark 21 representing the in-focus state is lit, the focusing operation is interrupted. If the arrow mark 22 or 23 is lit, the distance dial need only be rotated in the direction indicated by the arrow mark 22 or 23, respectively, until the in-focus mark 21 is lit.

The configuration of the timing generator TMGE will be described with reference to FIGS. 6 and 7.

Figure 6:
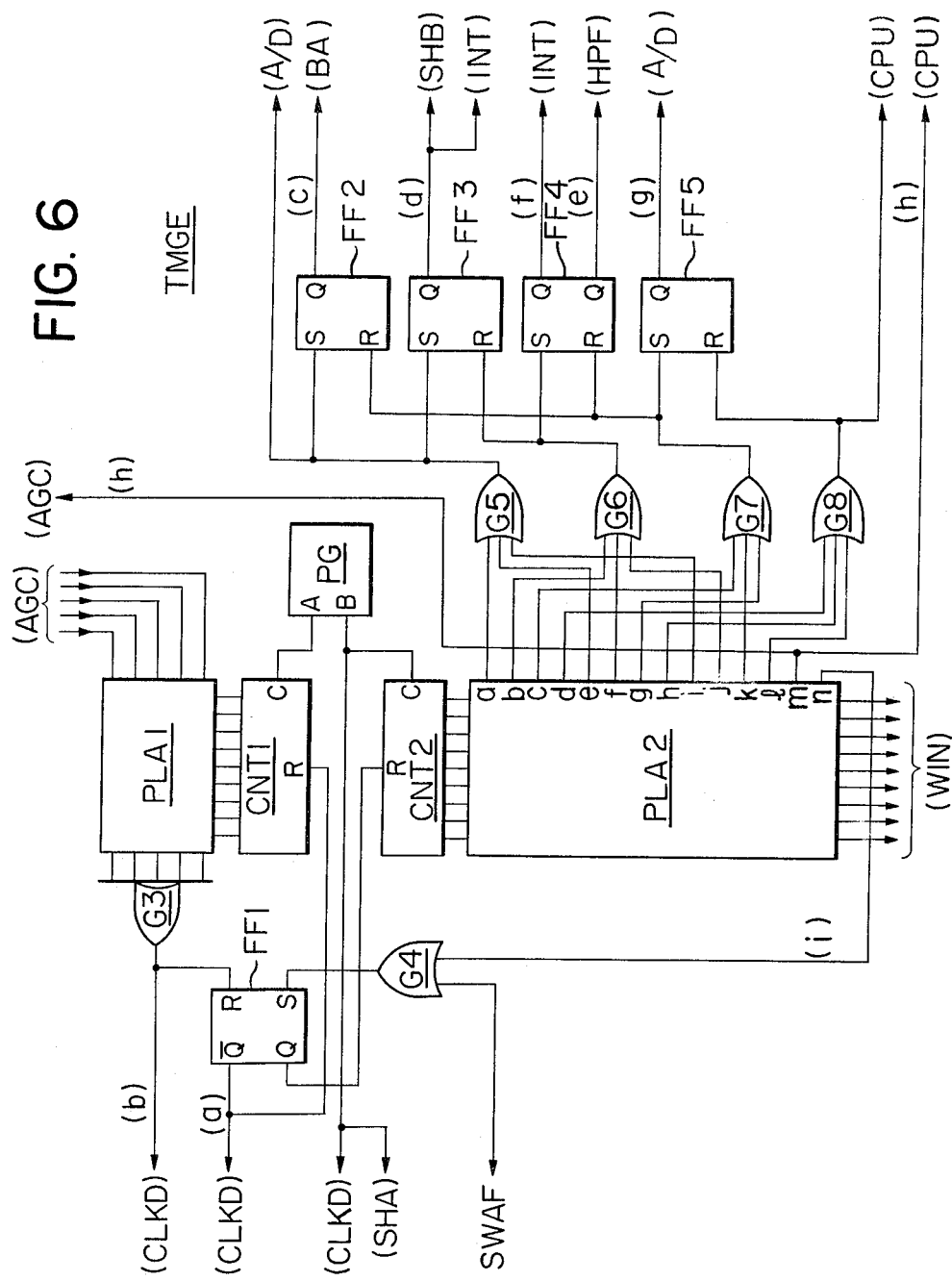
FIG. 6 is a block diagram showing the configuration of a timing generator in the circuitry shown in FIG. 2.
Figure 7:
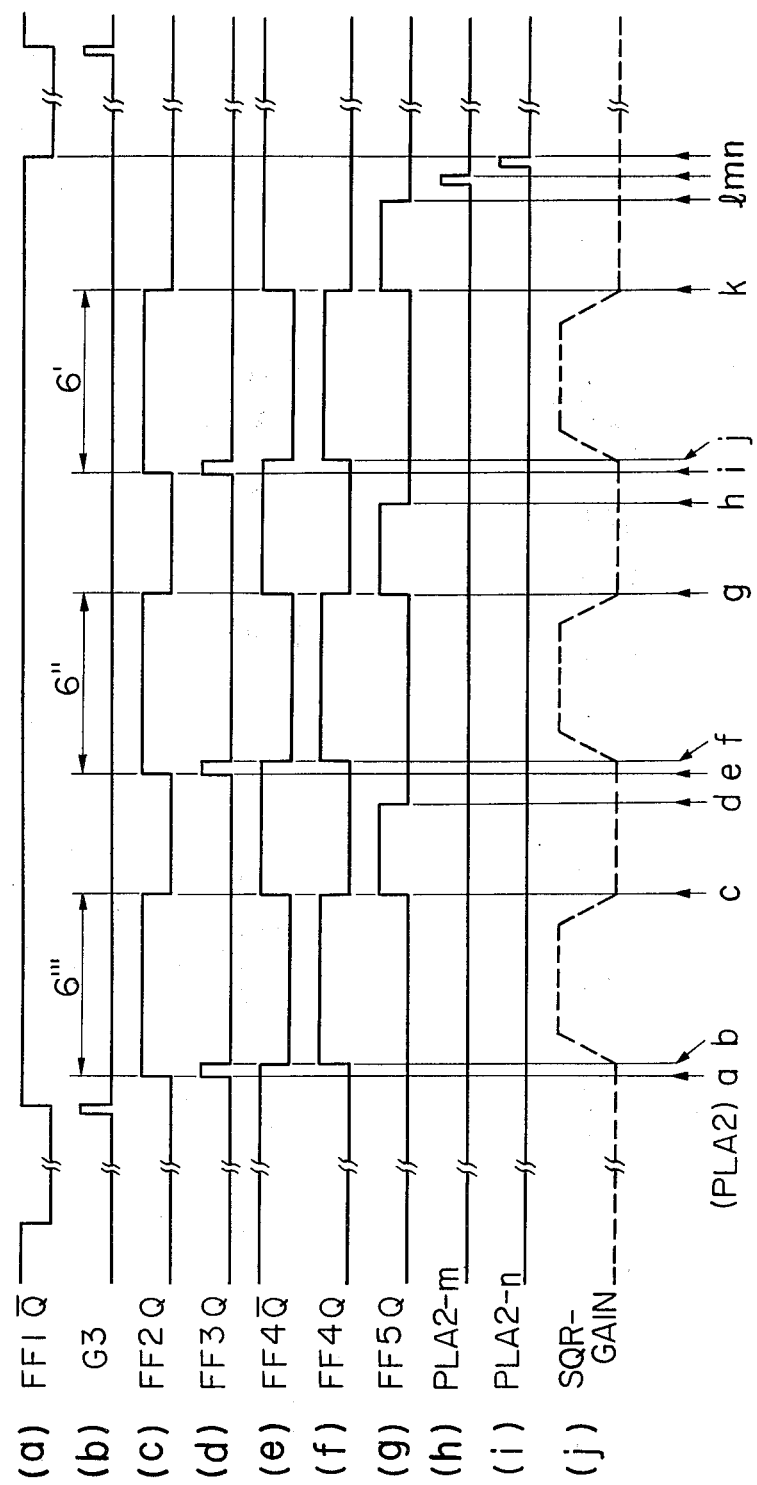
FIG. 7 is a timing chart showing timing signals for controlling various operations which are output from the timing generator shown in FIG. 6.

Referring to FIG. 6, the part of the circuitry consisting of a counter CNT1, a programmable logic array PLA1 and an OR gate G3 mainly serves to regulate the accumulating time of the CCD 6. The counter CNT1 counts a pulse train A from a pulse generator PG. When the count of the counter CNT1 reaches an accumulating time value which is set by the output of the accumulating time control circuit AGC, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the readout of the signals from the CCD 6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\overline{Q}$ output of the RS flip-flop FF1 as shown in FIG. 7(a) is supplied as a control signal to the clock driver CLKD. The CCD 6 has an overflow drain gate which is opened or closed according to the $\overline{Q}$ output of the RS flip-flop FF1 (the gate is opened when the $\overline{Q}$ output is at high level and is closed when it is at low level) to thereby control the accumulation of the signal charge by the CCD 6. The interval shown in FIG. 7(a) in which the $\overline{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the up/down counter UDC, the accumulating time of the signal charge of the CCD 6 is regulated by the output of the up/down counter UDC. The $\overline{Q}$ output of the RS flip-flop FF1 is supplied to the counter CNT1 as a reset signal. Therefore, the counter CNT1 performs counting only during the interval in which the Q output of the flip-flop FF1 is at low level and is kept reset in other conditions.

The circuitry part including a counter CNT2, a programmable logic array PLA2, OR gates G5 to G8, and RS flip-flops FF2 to FF5, mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) are in one-to-one relationship. The pulse train B is also supplied to the sampling and holding circuit SHA as the sampling pulse. The content of the programmable logic array RLA2 is so programmed that, based on the count output from the counter CNT2, pulses are generated from terminals a to n at the respective timings shown in FIGS. 7(a) to 7(n) after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminals d, h and l of the programmable logic array PLA2, the OR gate G8 produces an output which is supplied to the reset terminal of the RS flip-flop FF5. The $\overline{Q}$ outputs of the RS flip-flops FF2 to FF5 and the Q output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\overline{Q}$ output (FIG. 7(e)) of the RS flip-flop FF4 corresponds to the effective image signal bit of the outputs of each of the light-receiving sections 6''', 6'' and 6', and is supplied to the high-pass filter HPF as a reset signal. In this manner, the high-pass filter HPF is released from the reset condition only during the low level interval of the $\overline{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D convertion circuit A/D as an A-D conversion command. The output of the OR gate G5 is supplied to the A-D converting circuit A-D as a reset signal. The output of the OR gate G8 is supplied to the central processing circuit CPU as a strobe pulse for storing the output from the A-D converting circuit A/D. The output (FIG. 7(h)) from the terminal m of the programmable logic array PLA2 is supplied to the accumulating time control circuit AGC and the central processing unit CPU as a latch pulse for latching the outputs thereof. The output (FIG. 7(i)) from the terminal n of the programmable logic array PLA2 is supplied to the OR gate G4 as a set signal of the RS flip-flop FF1. The Q output of these flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(j). The window function generating circuit WIN may be of the configuration as disclosed in U.S. patent application Ser. No. 151,703, filed on May 20, 1980 by Kawabata et al (corresponding German Patent Application No. P 30 19 908.7) of the assignee of the present invention.

Assuming that the focus detecting system as described above is incorporated into a single reflex camera, and if the CCD 6 is so positioned that the light from the photographing lens to the CCD 6 is blocked during film exposure, the level of the output from the CCD 6 becomes extremely low during film exposure as shown in FIG. 4B. Thus, the signal accumulating time will be set at the maximum extent of the time adjustable by the accumulating time control circuit AGC responsive to the outputs (of low level in this case) from the comparators COMPA and COMPB. It takes, therefore, a considerable period of time before the accumulating time is restored to a suitable value upon the next photographing operation. Then, the reliability of the system is degraded and the operation of the system becomes unstable, and when the continuous photographing is to be performed, the shutter chances may be missed.

The present invention effectively eliminates such disadvantages by the improvements as will now be described below.

Figure 10:
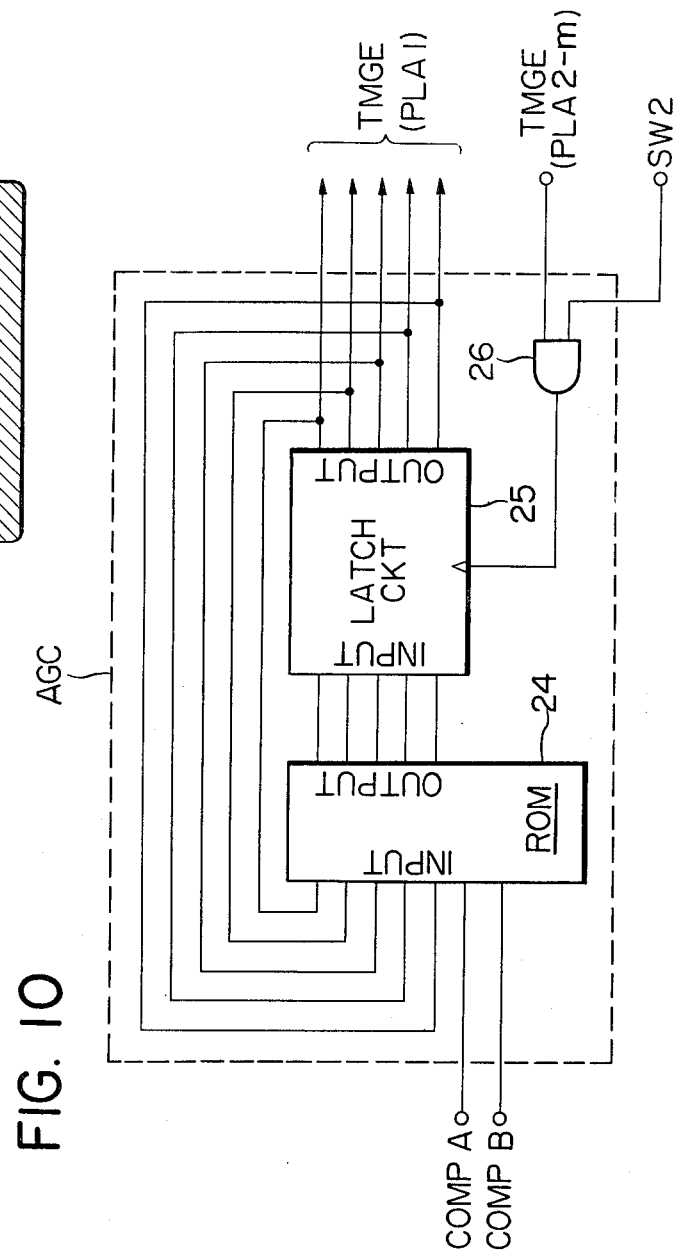
FIG. 10 is a partial block diagram showing an example of a signal integrating time (accumulating time) control circuit according to the improvements of the present invention in the circuitry shown in FIG. 9.
Figure 9:
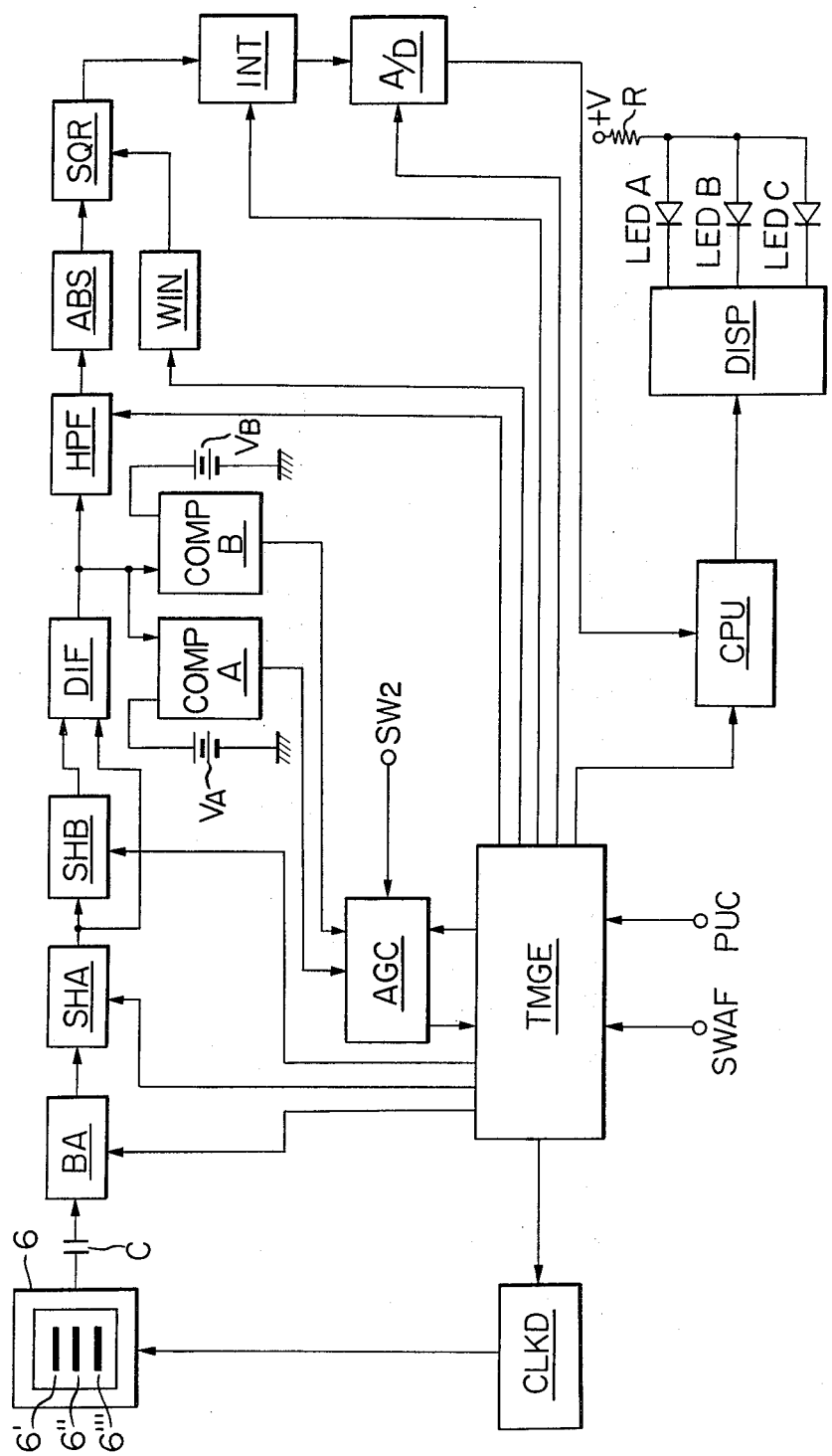
FIG. 9 is a block diagram showing the configuration of electric circuitry of one embodiment of the focus detecting system for a camera to which the improvements of the present invention is applied.

FIGS. 9 and 10 show an embodiment in which the improvements of the present invention is applied to the focus detecting system as described above.

The circuitry shown in FIG. 9 has essentially the same configuration as that shown in FIG. 2. However, FIG. 9 circuitry differs from that in FIG. 2 in the point that a photographing (film exposure) signal SW2 (to be referred to as a signal SW2 hereinafter) is generated in association with the photographing (film exposure) operation of the camera and is supplied to the accumulating time control circuit AGC, so that, during film exposure, the accumulating time of the CCD 6 is fixed at the value of that of the accumulating operation just before the film exposure operation. The signal SW2 as described above is generated in association with the depression to the second position of the shutter release button, the return operation of the quick return mirror, or the like. In the present embodiment, the signal SW2 is at low level during film exposure and is at high level in other cases. When the signal SW2 is at high level, the accumulating time control circuit AGC controls the accumulating time in accordance with the levels of the output signals from the comparators COMPA and COMPB and on the basis of the data updating clock from the timing generator TMGE. When the signal SW2 goes to low level, the accumulating time control circuit AGC fixes the accumulating time at the value immediately before the signal SW2 goes to low level.

FIG. 10 shows an example of the accumulating time control circuit AGC having the function as described above. In FIG. 10, the outputs from the comparators COMPA and COMPB and the output from a latch circuit 25 representing the current accumulating time are input to a ROM (Read-Only Memory) 24. The outputs from the ROM 24 are input to the latch circuit 25. An AND gate 26 receives the data updating clock signal (FIG. 7(h)) from the timing generator TMGE (FIG. 6, PLA2-m) and the signal SW2. The output from the AND gate 26 is supplied to the latch circuit 25 as a sampling (loading) signal. In the ROM 24 is stored a program according to which the accumulating time is constantly kept optimum in accordance with the current accumulating time based on the levels of the outputs from the comparators COMPA and COMPB and the output from the latch circuit 25. Thus, the output signal from the ROM 24 is the signal which sets the next accumulating time as a function of the preceding accumulating time and the outputs from the comparators COMPA and COMPB. The output signal from the ROM 24 is supplied to the latch circuit 25. The AND gate 26 which operates in response to the signal SW2 and the updating clock signals from the timing generator TMGE is connected to the sampling terminal of the latch circuit 25. When the signal SW2 is at high level, every time the updating signal from the timing generator TMGE is received, the accumulating time control signal obtained on the basis of the output from the ROM 24 at this time is input to the timing generator TMGE (FIG. 6, PLA1) by the latch circuit 25. However, when the signal SW2 goes to low level, the immediately preceding accumulating time control signal is held fixed by the latch circuit 25, so that the accumulating time of the CCD 6 may not be changed until the signal SW2 goes to high level again. When film exposure is completed and the signal SW2 goes to high level again, the accumulating time may then be controlled continuously from the fixed value. Thus, the problems as described hereinbefore are eliminated. In this manner, the latch circuit 25 and the AND gate 26 serve as the accumulating time fixing means.

Figure 11:
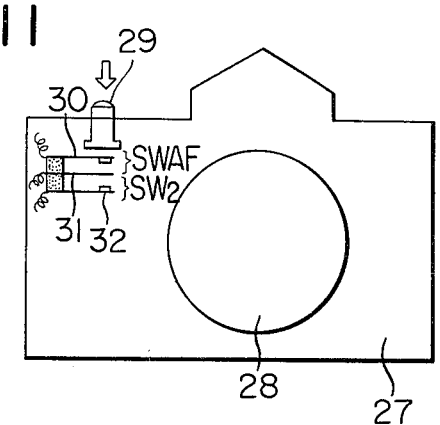
FIGS. 11 and 12 are views showing examples of the configuration of two cameras for generating signal for operating the focus detecting system and a photographing start (a film exposure start) signal, in association with the photographing operation of the camera.
Figure 12:
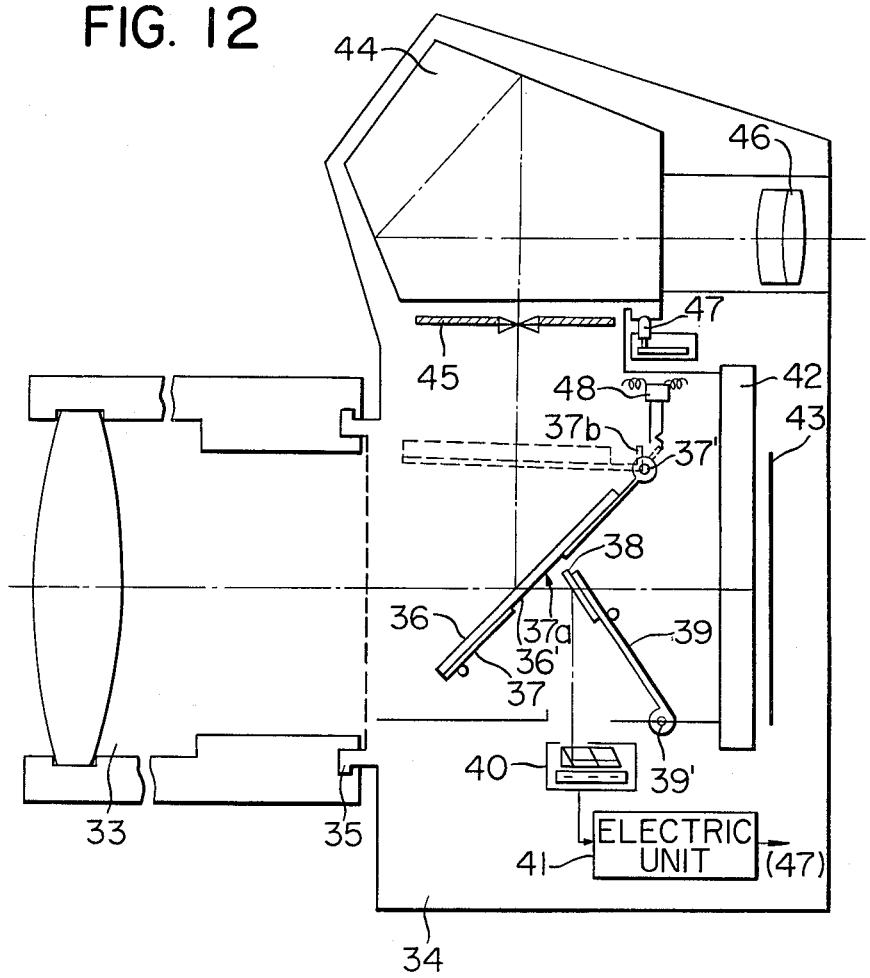

The signal SW2 can be generated by an arrangement such as shown in FIG. 11 or 12.

FIG. 11 shows the mechanism which generates the signals SWAF and SW2 as described above in association with the depression of the shutter release button of a single reflex camera with a main body 27 and a photographic lens 28. When a shutter release button 29 is depressed in the direction of arrow, a switch comprising contacts 30, 31 and 32 is operated. When the shutter release button 29 begins to be depressed, the contacts 30 and 31 are first closed. The contact 31 is grounded while the contact 30 is connected to the photometer and the focus detecting system (timing generator TMGE) shown in FIG. 9. The contacts 30 and 31 generate the signal SWAF, that is, when the contacts 30 and 31 are opened, the signal SWAF of high level is generated, and when these contacts 30 and 31 are closed, the signals SWAF of low level is generated. When the shutter release button 29 is depressed further, the contacts 31 and 32 are closed. The contact 32 is connected to a power source through a pull-up resistor (not shown). When the contacts 31 and 32 are closed, the contact 32 is grounded. The closure of the contacts 31 and 32 are effective to initiate the film exposure operation of the camera and also to fix the accumulating time in the manner as described with reference to FIGS. 9 and 10. Thus, the contacts 31 and 32 generate the signal SW2, that is, when the contacts 31 and 32 are opened, the signal SW2 of high level is generated, and when the contacts 31 and 32 are closed, the signal SW2 of low level is generated.

FIG. 12 shows a mechanism for generating the signal SW2 in association with the operation of a quick return mirror of the camera. In this case, the signal SWAF may be generated by contacts such as the contacts 30 and 31 which operate upon depression of the shutter release button as shown in FIG. 11. In FIG. 12, a photographing lens 33 is mounted to a camera main body 34 through a lens mount 35 formed integrally with part of the camera main body 34. A quick return mirror 36 comprises a semi-transmittal mirror which has a suitable transmissivity at a part 36' or entirely. The quick return mirror 36 is supported by a support member 37 of known configuration which is pivotal about a shaft 37'. The support member 37 has an opening 37a to allow transmission of part of the incident light therethrough. A submirror 38 serves to deflect the incident light downward. The submirror 38 is supported by a support member 39 which is pivotal about a shaft 39'. A light-receiving unit 40 comprises a housing which houses the beam splitter optical system and the image sensor described with reference to FIG. 1A. The quick return mirror 36 and the submirror 39 are withdrawn from or move out of the optical path in response to the depression of the shutter release button (not shown) for film exposure. An electric unit 41 includes a processing circuit described with reference to FIG. 2 which processes the image signal from the light-receiving unit 40, and a circuit which generates an indication signal. The light-receiving unit 40 and the electric unit 41 may be formed into a unit. A shutter 42 of known structure is disposed in front of film 43. A pentaprism 44 is disposed above a focusing plate 45. An objective lens 46 is arranged behind the pentaprism 44. An LED 47 as an indicating means is arranged below the pentaprism 44. By means of this LED 47, the focusing state of the photographing lens 33 is indicated at a part of the finder. The LED 47 is connected to the electric unit 41 a wire (not shown). A switch 48 for generating the signal SW2 is closed by a projection 37b of the support member 37 when the quick return mirror 36 is moved to the position indicated by the broken line. One contact of the switch 48 is grounded while the other contact is connected to the power source through a pull-up resistor (not shown). When the quick return mirror 36 is moved upward, the signal SW2 is generated by the switch 48. When the switch 48 is opened, the signal SW2 is at high level. When the switch 48 is closed, the signal SW2 is at low level. In this manner, the accumulating time can be fixed. The switch 48 of this embodiment may also be operated in synchronism with the operation of the submirror 39.

In summary, according to the present invention, there is provided a camera which uses a signal integrating and accumulating type image sensor, as a light-receiving means, for receiving light from a photographing optical system prior to the photographing operation and for producing an output which may be utilized for a predetermined purpose. The signal integrating time of the image sensor is controlled in accordance with the output from the image sensor, wherein the unstable operation or poor response in the photographing operation due to the signal accumulating time control when there is no incident light on the image sensor can be effectively prevented. Therefore, stability and high reliability or response of the system can be assured even in the case of continuous photographing.

What we claim is:
1. A camera, comprising:
focusing adjustable lens means for forming an image of an object on a predetermined focal plane;
an exposure system for exposing a film disposed at said focal plane to light from said lens means;
a focus detecting system for detecting the focus state of said lens means with respect to the object, said focus detecting system including:
signal integration type image sensing means being arranged to receive light from said lens means, said sensing means having a plurality of sensing elements for producing electrical signals representative of the integration of intensity of respective light distribution portions during a controlled signal integration time;
circuit means for processing the electrical signals provided by said image sensing means to produce an output indicative of the focus state of said lens means with respect to the object; and signal integration time control means for controlling said signal integration time of said image sensing means; and inhibit means associated with said exposure system, for inhibiting the change of said signal integration time controlled by said signal integration time control means in response to the film exposure operation of said exposure system.

2. The camera according to claim 1, wherein said inhibit means prevents, upon film exposure by said exposure system, the integration time from being changed from the value which has been set by said signal integration time control means.

3. The camera according to claim 2, wherein said signal integration time control means is arranged to select an appropriate signal integration time out of a plurality of predetermined different integration times; and said inhibit means is arranged to prevent, upon film exposure by said exposure system, the signal integration time from being changed from the value which has been selected by said signal integration time control means.

4. The camera according to claim 3, wherein said signal integration time control means is arranged to select the appropriate time out of the plurality of predetermined different times on the basis of the electrical signals provided by said image sensing means.

5. The camera according to claim 1, 2, 3 or 4, wherein said exposure system includes:

an exposure mechanism for exposing the film to the light; and trigger means for triggering said exposure mechanism for the film exposure: and said inhibit means is arranged to inhibit the change of said signal integration time in response to the triggering of said exposure mechanism by said trigger means.

6. The camera according to claim 1, 2, 3 or 4, wherein said exposure system includes;

an exposure mechanism operable for exposing the film to the light; and trigger means for triggering said exposure mechanism for the film exposure; and said inhibit means is arranged to inhibit the change of said signal integration time in response to the operation of said exposure mechanism for the film exposure.

7. The camera according to claim 6, wherein said exposure mechanism includes:

a view finder mirror adapted to move out of an optical path between said lens means and the film for the film exposure; and said inhibit means is arranged to respond to the movement of said view finder mirror.

8. The camera according to claim 7, wherein said image sensing means in said focus detecting system is arranged to receive the light by said view finder mirror.

9. The camera according to claim 8, wherein said focus detecting system further includes:

an auxiliary mirror for causing the light coming through said view finder mirror to impinge on said image sensing means, said auxiliary mirror being movable in synchronism with said view finder mirror to move out of said optical path causing said image sensing means to be prevented from receiving the light.

10. The camera according to claim 5, wherein said exposure mechanism includes:

a view finder mirror adapted to move out of an optical path between said lens means and the film for the film exposure; and said image sensing means in said focus detecting system is arranged to receive the light by said view finder mirror.

11. The camera according to claim 10, wherein said focus detecting system further includes:

an auxiliary mirror for causing the light coming through said view finder mirror to impinge on said image sensing means, said auxiliary mirror being movable in synchronism with said view finder mirror to move out of said optical path causing said image sensing means to be prevented from receiving the light.

12. The camera according to claim 1, 2, 3 or 4, wherein said exposure system includes:

a view finder mirror adapted to move out of an optical path between said lens means and the film for the film exposure; and p1 said image sensing means in said focus detecting system is arranged to receive the light by said view finder mirror.

13. The camera according to claim 12, wherein said focus detecting system further includes:

an auxiliary mirror for causing the light coming through said view finder mirror to impinge on said image sensing means, said auxiliary mirror being movable in synchronism with said view finder mirror to move out of the optical path causing said image sensing means to be prevented from receiving the light.

14. The camera according to claim 7, wherein said inhibit means is arranged to cause said signal integration time control means to fix the signal integration time.

15. The camera according to claim 6, wherein said inhibit means is arranged to cause said signal integration time control means to fix the signal integration time.

16. The camera according to claim 5, wherein said inhibit means is arranged to cause said signal integration time control means to fix the signal integration time.

17. The camera according to claim 1, 2, 3 or 4, wherein said inhibit means is arranged to cause said signal integration time control means to fix the signal integration time.

18. A camera, comprising:

lens means for taking a picture of an object;

signal integration type radiation sensing means being arranged to receive radiation coming through said lens means;

circuit means for processing output signals of said sensing means to produce an output related to the picture of the object;

integration period control means for controlling an integration period during which said sensing means integrates signals in response to the received radiation; and inhibit means for inhibiting the changing of said integration period controlled by the integration period control means in response to the picture-taking operation of the camera.

19. The camera according to claim 18, wherein said inhibit means is arranged to prevent, upon picture-taking, the integration period from being changed from that which has been set by said integration period control means.

20. The camera according to claim 19, wherein said integration period control means is arranged to select an appropriate integration period out of a plurality of different periods; and said inhibit means is arranged to prevent, upon picture-taking, the integration period from being changed from that which has been selected by said integration period control means.

21. The camera according to claim 20, wherein said integration period control means is arranged to select said appropriate integration period out of the plurality of different periods on the basis of the output signal of said sensing means.

22. The camera according to claim 18, 19, 20 or 21, wherein said inhibit means is arranged to cause said integration period control means to fix the integration period.

23. The camera according to claim 22, further comprising:

trigger means for actuating the picture-taking operation of the camera;

said inhibit means being arranged to inhibit the changing of the integration period in response to the actuation of said picture-taking operation of the camera by the trigger means.

24. The camera according to claim 22, further comprising:

means movable for taking the picture;

said inhibit means being arranged to inhibit the changing of the integration period in response to the movement of said movable means.

25. The camera according to claim 18, 19, 20 or 21, further comprising:

trigger means for actuating the picture-taking operation of the camera;

said inhibit means being arranged to inhibit the changing of the integration period in response to the actuation of said picture-taking operation of the camera by the trigger means.

26. The camera according to claim 18, 19, 20 or 21, further comprising:

means movable for taking the picture;

said inhibit means being arranged to inhibit the changing of the integration period in response to the movement of said movable means.

* * * * *

UNITED STATES PATENT AND TRADEMARK OFFICE
CERTIFICATE OF CORRECTION

PATENT NO. : 4,411,505                            Page 1 of 2

DATED : October 25, 1983

INVENTOR(S) : SHINJI SAKAI, ET AL.

It is certified that error appears in the above-identified patent and that said Letters Patent is hereby corrected as shown below:

Column 1, line 16, "has" should read --have--;
           line 22, "reflux" should read --reflex--;
           line 34, after "and" insert --the--;
           line 65, "reflux" should read --reflex--;
           line 66, "so" should read --no--.

Column 2, line 23, "responsible" should read --response--.

Column 4, line 27, "coinside" should read --coincide--.

Column 9, line 49, "representing" should read --represent--.

Column 10, line 41, "Q" should read --$\overline{Q}$--.

Column 11, line 11, "Q" should read --$\overline{Q}$--;
            line 34, "convertion" should read --conversion--.

Column 14, line 17, after "41" insert --through--.

Column 16, line 22, Claim 12, delete "pl".

UNITED STATES PATENT AND TRADEMARK OFFICE
CERTIFICATE OF CORRECTION

PATENT NO. : 4,411,505

DATED : October 25, 1983

INVENTOR(S) : SHINJI SAKAI, ET AL.

It is certified that error appears in the above-identified patent and that said Letters Patent is hereby corrected as shown below:

Column 18, line 1, Claim 23, "said" should read --the--;
          line 2, Claim 23, "the" should read --said--.

Signed and Sealed this

Twenty-ninth Day of May 1984

[SEAL]

*Attest:*

GERALD J. MOSSINGHOFF

*Attesting Officer*     *Commissioner of Patents and Trademarks*